United States Patent
Cramer et al.

(10) Patent No.: US 8,868,921 B2
(45) Date of Patent: Oct. 21, 2014

(54) METHODS AND SYSTEMS FOR AUTHENTICATING USERS OVER NETWORKS

(75) Inventors: Jason Scott Cramer, Vienna, VA (US); Andrew Supplee Webb, Dover, DE (US); Christopher Eric Holland, Fairfax, VA (US); Conor Robert White, Fairfax, VA (US)

(73) Assignee: Daon Holdings Limited, George Town (KY)

( * ) Notice: Subject to any disclaimer, the term of this patent is extended or adjusted under 35 U.S.C. 154(b) by 412 days.

(21) Appl. No.: 13/186,900

(22) Filed: Jul. 20, 2011

(65) Prior Publication Data
US 2013/0024918 A1    Jan. 24, 2013

(51) Int. Cl.
| | | |
|---|---|---|
| *G06F 21/20* | (2006.01) | |
| *G06F 21/34* | (2013.01) | |
| *H04L 29/06* | (2006.01) | |
| *H04L 9/32* | (2006.01) | |

(52) U.S. Cl.
CPC ............ *G06F 21/34* (2013.01); *H04L 63/0838* (2013.01); *H04L 63/0876* (2013.01); *H04L 9/3228* (2013.01); *H04L 9/3231* (2013.01)
USPC ...................... 713/184; 726/6; 726/7; 726/19

(58) Field of Classification Search
None
See application file for complete search history.

(56) References Cited

U.S. PATENT DOCUMENTS

| | | | | |
|---|---|---|---|---|
| 5,481,611 | A  * | 1/1996 | Owens et al. ................. | 713/159 |
| 5,491,752 | A  * | 2/1996 | Kaufman et al. .............. | 380/30 |
| 5,731,575 | A  * | 3/1998 | Zingher et al. ............... | 235/379 |
| 6,173,400 | B1 * | 1/2001 | Perlman et al. .............. | 713/172 |
| 2002/0198848 | A1 * | 12/2002 | Michener ........................ | 705/75 |
| 2007/0050635 | A1 * | 3/2007 | Popp ............................. | 713/185 |
| 2007/0101152 | A1 * | 5/2007 | Mercredi et al. ............. | 713/185 |
| 2007/0130463 | A1 * | 6/2007 | Law et al. ..................... | 713/168 |
| 2007/0180234 | A1 * | 8/2007 | Labaton ........................ | 713/159 |
| 2008/0212771 | A1 * | 9/2008 | Hauser ............................ | 380/44 |
| 2010/0107229 | A1 * | 4/2010 | Najafi et al. ...................... | 726/6 |
| 2011/0197266 | A1 * | 8/2011 | Chu et al. ......................... | 726/5 |

OTHER PUBLICATIONS

"Handbook of Applied Cryptography", Alfred J. Menezes , Paul C. van Oorschot , and Scott A. Vanstone, CRC Press, 1996, Chapter 10, 40 Pages.*

* cited by examiner

*Primary Examiner* — Matthew Henning
(74) *Attorney, Agent, or Firm* — Kevin McDermott, Esq.

(57) ABSTRACT

A method for authenticating users over networks includes requesting a one-time password, entering a personal identification number into a communications device, and retrieving a replaceable shared secret stored in the communications device. Moreover, the method includes generating a hashed personal identification number from the entered personal identification number, combining the hashed personal identification number with the replaceable shared secret to generate a modified shared secret, and generating a one-time password with the modified shared secret and the time of requesting the one-time password.

19 Claims, 8 Drawing Sheets

| Request No. | Time | Date |
|---|---|---|
| 1 | 9:00 AM | July 17, 2011 |
| 2 | 10:30 AM | July 17, 2011 |
| 3 | 3:00 PM | July 17, 2011 |
| 4 | 9:00 PM | July 17, 2011 |

FIG. 7

| Request No. | Time | Date |
|---|---|---|
| 1 | 9:00 AM | July 17, 2011 |
| 2 | 10:30 AM | July 17, 2011 |
| 3 | 9:00 PM | July 17, 2011 |
| 4 | 3:00 PM | July 17, 2011 |

FIG. 10

METHODS AND SYSTEMS FOR AUTHENTICATING USERS OVER NETWORKS

BACKGROUND OF THE INVENTION

This invention relates generally to methods and systems for authenticating users over networks, and more particularly, to methods and systems for authenticating users over networks with a one-time password generated using a replaceable shared secret, time, and a knowledge-based attribute.

Users are known to access confidential data, such as bank account details, and confidential web sites such as virtual private networks over communications networks such as the Internet. However, individuals have been known to surreptitiously obtain information such as passwords and usernames by phishing over the networks, and to use the obtained information to conduct fraudulent transactions. Such fraudulent transactions have been known to compromise the security of confidential data.

One known method for increasing the security of confidential data and web sites against fraudulent transactions uses a device that implements dual factor authentication based on a moving factor and a shared secret. In such an implementation, the moving factor may be time or may be an event. The device may be a hardware dongle or a software application operable on computer devices such as, but not limited to, personal computers, tablet computers, laptop computers, and smart phones. Each device generates one-time passwords based on the shared secret and the time of generation, and is operable to display the generated one-time password for the authorized user to see. In order to gain access to a confidential web site or to gain access to confidential data included in a web site, authorized users have been known to enter the generated one-time password in the web site at the time of attempted access. A computer system supporting the confidential web site authenticates the entered one-time password and grants the user access when the password is authenticated. However, when the one-time password is not authenticated the user is not granted access.

The shared secret included in the device is typically difficult to change once included in the device. As such, it may be time consuming and expensive to change a shared secret after it is included in a device. Thus, when a shared secret becomes known to unauthorized users as the result of a security breach, the device including the breached shared secret may be rendered useless. Additionally, should an authorized user be coerced into entering the one-time password in the confidential web site for requesting access, mechanisms may not be available for notifying the web site operator that the requested access is effectively unauthorized and may result in unauthorized confidential data retrieval.

BRIEF DESCRIPTION OF THE INVENTION

In one aspect, a method for authenticating users over networks is provided. The method includes requesting a one-time password, entering a personal identification number into a communications device, and retrieving a replaceable shared secret stored in the communications device. Moreover, the method includes generating a hashed personal identification number from the entered personal identification number, combining the hashed personal identification number with the replaceable shared secret to generate a modified shared secret, and generating a one-time password with the modified shared secret and the time of requesting the one-time password.

In another aspect, a system for authenticating users over networks is provided. The system includes a service provider system. The service provider system includes at least a database and is configured to store within the database at least resources and unique user identifiers. Moreover, the system includes a computing device configured to at least communicate with the service provider system and an authentication system. The authentication system includes an authentication database and is configured to communicate with at least the service provider system and the computing device. The authentication system is also configured to store within the authentication database authentication data associated with each of a plurality of authorized users, to generate and store shared secrets, to generate one-time passwords, and to conduct an authentication process.

Furthermore, the system includes a communications device configured to at least communicate with the authentication system, obtain authentication data, store shared secrets, replace shared secrets with new shared secrets, generate hashed personal identification numbers, and generate one-time passwords. The authentication system is further configured to communicate with the communications device. The communications device is further configured to replace a shared secret with a new shared secret and to combine a hashed personal identification number with the new shared secret to generate a modified shared secret. Additionally, the communications device is configured to generate a one-time password with the modified shared secret and a time the one-time password is requested, and to transmit the one-time password to the authentication system.

In yet another aspect, a computer program recorded on a non-transitory computer-readable recording medium included in a computer system is provided. The computer program is for enabling authentication of a user attempting to access resources stored in the computer system. The computer program is for causing the computer system to execute at least retrieving a replaceable shared secret upon receiving a request for a one-time password, generating a hashed personal identification number from a personal identification number entered into the transaction management system, and combining the hashed personal identification number with the replaceable shared secret to generate a modified shared secret. Moreover, the computer program is for causing the computer system to execute at least generating the one-time password with the modified shared secret and the time of the request, determining a plurality of time intervals, and generating a series of passwords that includes a password for each time interval. Each of the passwords is generated using the modified shared secret and the beginning time of a respective interval of time. Furthermore, the computer program is for causing the computer system to execute at least comparing the one-time password against each password included in the series of passwords, and permitting the user to access the resources when the one-time password matches one of the passwords included in the series of passwords.

DETAILED DESCRIPTION OF THE INVENTION

Figure 1:
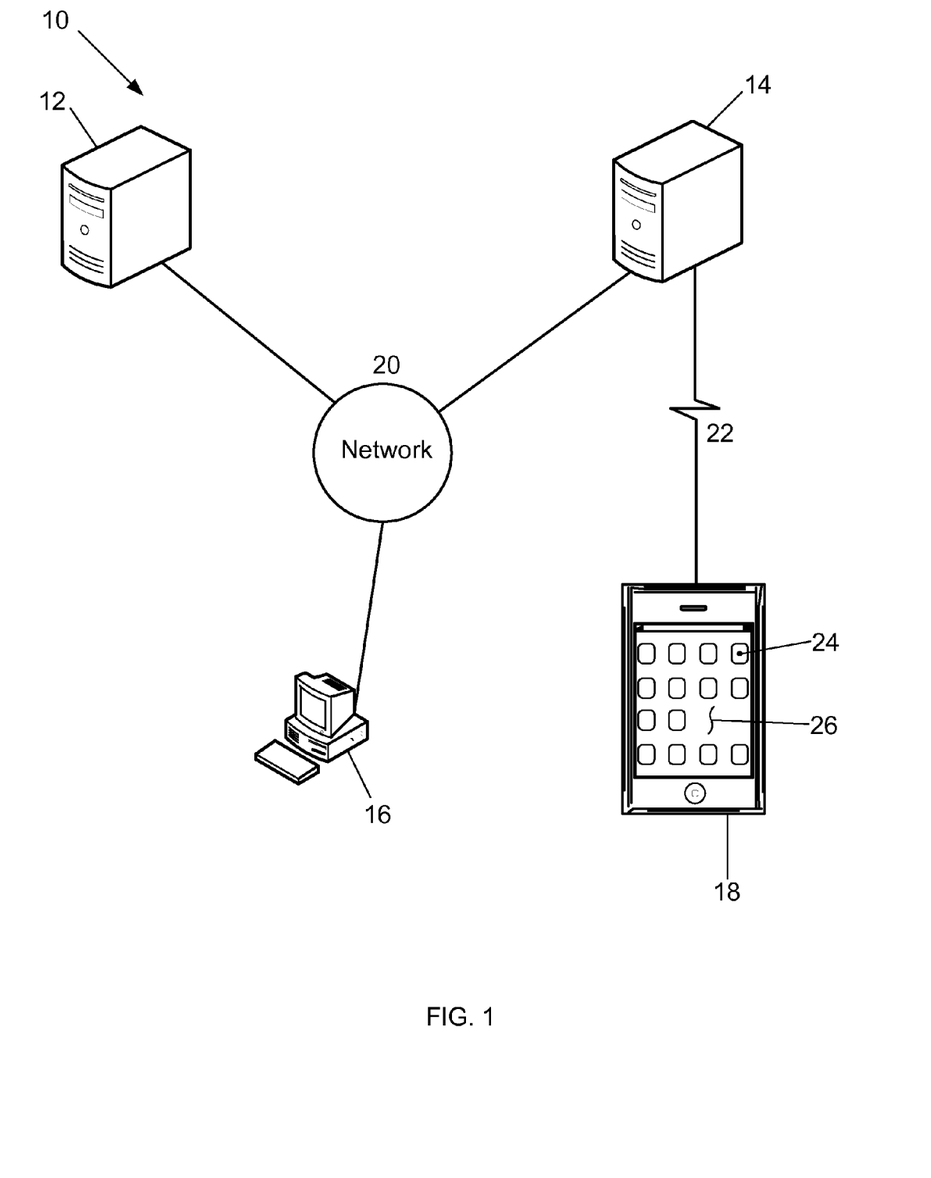
FIG. 1 is a block diagram of an exemplary embodiment of a transaction management computer system for authenticating users over networks.

FIG. 1 is an expanded block diagram of an exemplary embodiment of a system architecture of a Transaction Management Computer (TMC) system 10 for authenticating users over networks who attempt to access protected resources over such networks and for conducting shared secret replacement processes. More specifically, the TMC system 10 includes a Service Provider Computer (SPC) System 12, an Authentication Computer (AC) System 14, a computing device 16, a communications device 18, a first communications network 20 and a second communications network 22. The SPC system 12 and the AC system 14 each include components such as, but not limited to, a web server, a database server, an application server, a directory server and a disk storage unit. The disk storage unit may be used to store any kind of data. The AC system 14 may also include a database management server and an authentication server. The authentication server is configured to perform matching of any feature or information associated with individuals to authenticate the identity of individuals including, but not limited to, determining the authenticity of one-time passwords generated for individuals.

The SPC system 12 is a computer system of a financial institution service provider that stores and manages resources for each of a plurality of authorized users, and protects access to the resources. Resources as described herein include any kind of data that may be protected against access by unauthorized users. Consequently, resources may include, but are not limited to, financial data, biographic data, electronic artifacts, services, computer systems, and applications.

Electronic artifacts include items such as, but not limited to, web documents. Financial data includes, but is not limited to, account balances. Biographic data includes any demographic information regarding an individual including, but not limited to, an individual's name, age, date of birth, address, citizenship and marital status. Services include, but are not limited to, checking-out an electronic shopping cart at a website and conducting a payment transaction. Computer systems include, but are not limited to, virtual private networks and such other networks or computer systems running such networks. Applications as described herein may be any kind of computer program that causes a computer, a computer processor, or a computer system to execute the program, and thus causes the computer to perform a function. For example, applications as described herein may include, but are not limited to, applications that facilitate performing privileged communications and applications that permit access to privileged information. It should be understood that such applications are made available to a user only upon authentication of the identity of the user. Moreover, it should be understood that by virtue of protecting the applications, the functions performed by those applications are also protected. Thus, by virtue of granting access to applications upon authentication of the identity of the user, access is also granted to the functions performed by those applications. Consequently, it should be appreciated that functions caused to be performed on a computer or computer system by applications stored throughout the TMC system 10, also constitute a resource.

Because the SPC system 12 is associated with a financial institution service provider, the resource stored therein is the financial data of each of the authorized users. Although the financial business is the example business described herein, the invention is in no way limited to the financial business. Thus, the SPC system 12 may be associated with any commercial or governmental entity service provider that stores and that protects resources by controlling access to the resources. Such other service providers include, but are not limited to, hospitals, companies, and local and state governments. Although the exemplary TMC system 10 includes one SPC system 12, a plurality of SPC systems 12, each associated with a different service provider, may be included in the TMC system 10.

The SPC system 12 is configured to communicate with the AC system 14 and the computing device 16 over the first communications network 20. In the exemplary embodiment, the first communications network 20 is the Internet. However, the first communications network 20 may alternatively be a local area network (LAN), a wide area network (WAN), or any combination of Internet, LAN and WAN. The SPC system 12 is configured to store therein at least a different service provider user identifier for each authorized user such that each service provider user identifier is associated with the resources of a respective authorized user. Moreover, the SPC system 12 is configured to store therein at least biographic data for each authorized user such that the biographic data is associated with the service provider user identifier of a respective authorized user. Furthermore, the SPC system 12 is configured to determine whether a user is authorized to access resources in the SPC system 12, to determine whether an enrolling user is authorized to enroll in the AC system 14, and to determine what actions should be taken when it is determined that a user is authenticating or otherwise operating under duress. The SPC system may also be configured to generate personal identification numbers and duress personal identification numbers.

The AC system 14 is configured to communicate with at least a plurality of SPC systems 12 over the communications network 20. Moreover, the AC system 14 is configured to at least facilitate conducting an authentication process by authenticating the identity of a user associated with the communications device 18 who requests access to resources associated with the user in the SPC system 12 from the computing device 16. The AC system 14 is also configured to at least receive personal identification numbers from the communications device 18 and to generate hashed personal identification numbers from the received personal identification numbers (PINs). After generating a hashed personal identification number from a received personal identification number (PIN), the AC system 14 discards the PIN and stores the hashed PIN therein. Alternatively, instead of discarding the PIN after generating the hashed PIN, the AC system 14 may store the PIN therein. The AC system 14 may also be configured to generate unique user identifiers, PINS, duress PINS, and error indicator numbers (EINs). It should be understood that PINS constitute a knowledge-based attribute.

The AC system 14 also stores a password generating application and executes the password generating application to generate one-time passwords (OTPs). Moreover, the password generating application causes the AC system 14 to at least update the OTPs, generate and store therein shared secrets and an associated effective life of each shared secret, determine when the effective life of each shared secret expires, and replace shared secrets and associated effective lives with new shared secrets and effective lives. The new shared secrets are different than the replaced shared secrets, but the new effective lives may be the same or different. The AC system 14 may also be configured to detect security breaches in which at least one shared secret stored therein has been obtained by an unauthorized user.

In order to facilitate accurately authenticating users, the AC system 14 is further configured to store authentication data in the form of an enrollment data record for each of the plurality of authorized users. Each enrollment data record may include authentication data such as, but not limited to, enrollment biometric data, an identifier of a designated communications device 18, a hashed PIN, a hashed duress PIN, an error indicator number (EIN), a unique user identifier of a user associated with the communications device 18, a shared secret, the effective life of the shared secret, a service provider identifier, and a service provider user identifier. Thus, the AC system 14 is configured to store authentication data and is configured to use the authentication data to facilitate authenticating users desiring to access resources over the first communications network 20. Enrollment biometric data is biometric data obtained from a respective user during enrollment in the AC system 14.

Authorized users permitted to access resources in the SPC system 12 associated with the authorized user designate a particular communications device to be used for authentication, and provide an identifier of the designated communications device that facilitates communicating with and authenticating the authorized user. The identifier of the designated communications device is referred to herein as the communications device identifier, which may be defined by the manufacturer of the communications device or by a communications device operating system. Alternatively, different information regarding the designated communications device may be provided such as, but not limited to, a telephone number associated with the designated communications device, an e-mail address that can be accessed using the designated communications device, an instant messaging user identifier that can be accessed with the designated communications device, an identifier that facilitates sending short message service (SMS) messages to the designated communications device, an identifier defined by an application running on the communications device, or an identifier entered by a user and stored on the communications device. In the exemplary TMC system 10, the communications device 18 is the designated communications device.

The AC system 14 is also configured to communicate with the communications device 18 over the second communications network 22. In the exemplary TMC system 10, the second communications network 22 is a 3 G communications network. However, the second communications network 22 may alternatively be any network, such as, but not limited to, WiFi, Global System for Mobile Communications (GSM) and Enhanced Data rates for GSM Evolution (EDGE). The SPC system 12 and the computing device 16 are also configured to communicate with the communications device 18 over the second communications network 22. However, as described herein, the SPC system 12 and the computing device 16 are unable to access the second communications network 22 and thus are unable to communicate directly with the communications device 18 over the second communications network 22.

The SPC system 12 is generally an existing computer system that does not include adequate authentication capabilities, and the AC system 14 is an authentication computer system configured to quickly connect to and provide rigorous authentication capabilities to service providers. Thus, it should be appreciated that as described herein, the SPC system 12 and the AC system 14 are each different computer systems and are not the same device or system. However, the SPC system 12 and the AC system 14 may be operated by the same entity.

The computing device 16 is a personal computer that may include devices, such as, but not limited to, a CD-ROM drive for reading data from computer-readable recording mediums, such as a compact disc-read only memory (CD-ROM), a magneto-optical disc (MOD) and a digital versatile disc (DVD). Moreover, the computing device 16 may include a display device, such as, but not limited to, a liquid crystal display (LCD), a cathode ray tube (CRT) and other display monitors. Furthermore, the computing device 16 may include a printer and input devices such as, but not limited to, a mouse (not shown), keypad (not shown), a keyboard, a camera (not shown) and a microphone (not shown). The computing device 16 is also configured to communicate with the SPC system 12 over the first communications network 20. Although the computing device 16 is a personal computer in the exemplary TMC system 10, the computing device 16 may alternatively be any computing device capable of at least communicating over the first communications network 20 including, but not limited to, tablet computers, laptop computers, and smart phones.

The communications device 18 is a portable smart phone configured to at least display at least one of text and images, capture or obtain authentication data from a user, obtain data from a user, and generate one-time passwords. The communications device 18 includes at least one of buttons and icons 24 configured to at least enter commands and data therein, and invoke applications stored therein. Moreover, the communications device 18 includes a display screen 26 such as, but not limited to, a Liquid Crystal Display (LCD), and is configured to display at least one of text and images on the display screen 26. Although the communications device 18 is a smart phone in the exemplary TMC system 10, the communications device 18 may alternatively be any other communications device configured to at least display at least one of text and images, generate one-time passwords, and obtain, capture and transmit data. Such other communications devices 18 include, but are not limited to, a cellular phone, a tablet computer, a laptop computer, a desktop personal computer, and any type of communications device having wireless capabilities such as a personal digital assistant (PDA).

The communications device 18 is configured to wirelessly communicate with at least the AC system 14 over the second communications network 22, and to store at least a shared secret, the effective life of the shared secret, a password generating application, a security application, and an EIN. Moreover, the communications device 18 is configured to generate a hash of a user entered PIN, combine the hashed PIN with the shared secret to generate a modified shared secret, and execute the password generating application to generate a one-time password (OTP). The password generating application is the same as that stored in the AC system 14.

Thus, the AC system 14 and the communications device 18 generate the same OTPs. Moreover, the password generating application causes the communications device 18 to at least display the generated OTP on the screen 26, update the OTPs, determine when the effective life of a shared secret expires, replace shared secrets and associated effective lives with new shared secrets and effective lives, and generate renewal messages. The new shared secrets are different than the replaced shared secrets, but the new effective lives may be the same or different. The shared secret is any type of information that may be stored in both the communications device 18 and the AC system 14. By virtue of being stored in the AC system 14 and the communications device 18, the shared secret is shared between the AC system and device 18. The communications device 18 may also be configured to detect security breaches in which at least one shared secret stored therein has been obtained by an unauthorized user.

The exemplary computer TMC system 10 is operable to combine a hashed PIN with the shared secret to generate the modified shared secret. More specifically, the password generating application causes the AC system 14 and the communications device 18 to generate an OTP using the modified shared secret and time as inputs, and to generate a new different OTP for each modified shared secret in thirty second time intervals using the beginning time of each thirty-second time interval. However, any time interval deemed suitable for authenticating users as described herein may be used. Generating a new OTP using the suitable time interval is referred to herein as updating the OTP. It should be appreciated that by virtue of generating the modified shared secret with a hashed PIN generated from a PIN known only to the authorized user, a more rigorous two-factor authentication process is provided versus contemporary processes.

A duress PIN as described herein is a PIN used by an authorized user during an emergency situation where the authorized user is typically coerced by a hostile individual to provide a standard PIN required for accessing resources in a computer system. By entering the duress PIN instead of the standard PIN, the authorized user is able to seemingly guilelessly cooperate with the hostile individual while secretly warning the operators of the SPC system 12 and AC system 14 about the emergency situation.

As described herein, an EIN is similar to a PIN that is stored in the AC system 14 and the communications device 18. It is substituted for a user entered PIN after determining that a security breach of the device 18 could have occurred and determining that the device 18 is unable to communicate with the AC system 14 to conduct a shared secret replacement process. The EIN is used for generating modified shared secrets.

The SPC system 12, the AC system 14, the computing device 16, and the communications device 18, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the SPC system 12, the AC system 14, the computing device 16, and the communications device 18. The above examples are exemplary only, and are thus not intended to limit in any way the definition and/or meaning of the term "processor."

The respective memories (not shown) in the SPC system 12, the AC system 14, the computing device 16, and the communications device 18, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the SPC system 12, the AC system 14, the computing device 16, and the communications device 18. Moreover, each of the respective memories (not shown) can be a computer-readable recording medium used to store computer programs or executable instructions that are executed, respectively, by the SPC system 12, the AC system 14, the computing device 16, and the communications device 18. Moreover, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program.

Although the communications device 18 is described as including a processor and memory, some communications devices 18 may not have adequate processing capability and memory to perform the functions described herein. When the communications device 18 does not have adequate processing capability and memory, it communicates with a smart card having adequate processing power and memory. The smart card is configured to store at least the shared secret, the effective life of the shared secret, the password generating application, the EIN, and the security application. Moreover, the smart card is configured to at least generate hashed PINs and modified shared secrets, execute the password generating application to generate OTPs, determine the expiration date of a shared secret, generate new shared secrets and associated effective lives, update OTPs, and communicate at least the OTPs and the new shared secrets and associated effective lives to the communications device 18.

The computing device 16, the first communications network 20, and the SPC system 12 together constitute a first communications channel. The communications device 18, the second communications network 22, and the AC system 14 constitute a second communications channel separate and distinct from the first communications channel. Attackers that are able to monitor communications and phish for user names and passwords over the first communications channel typically are not aware of the second communications channel, and thus are not motivated to monitor communications and phish over the second channel. As a result, security in accessing resources over networks is facilitated to be increased.

The communications device 18 and the AC system 14 communicate over the second communications network 22 during an enrollment process and during replacement processes when the shared secret and associated effective life are to be replaced in the communications device 18. Otherwise, the communication device 18 and the AC system 14 do not communicate over the second communications network 22.

Users are required to enroll in the AC system 14 prior to attempting to access resources stored in the SPC system 12 from the computing device 16. During enrollment in the AC system 14, enrollment biometric data, a unique user identifier, a hashed personal identification number (PIN), a hashed duress PIN, a service provider identifier of at least one service provider, and a service provider user identifier may be obtained from the enrolling user and may be stored in an enrollment data record created for the enrolling user. The service provider identifier functions to identify a service provider. When the user does not have the service provider identifier of at least one service provider during enrollment, the user may supply the service provider identifier of at least one service provider after enrollment for inclusion in his enrollment data record.

The communications device 18 is also required to be enrolled in the AC system 14 prior to attempting to access resources in the SPC system 12 from the computing device 16. Specifically, the communications device identifier and the EIN are obtained from the communications device 18 and are stored in the enrollment data record of the associated user. By virtue of being stored in the enrollment data record, the unique user identifier, the EIN, the communications device identifier, and the service provider identifier of at least one service provider are associated with each other. By including the unique user identifier, the communications device identifier, and the EIN in the enrollment data record, the designated communications device 18 is enrolled in the AC system 14.

When the user supplies a plurality of different service provider identifiers, each of the service provider identifiers is associated with the same unique user identifier in the AC system 14. Consequently, the AC system 14 is able to determine which SPC system 12 to communicate with for each user. Each different service provider has a corresponding SPC system 12 that stores therein at least the service provider user identifiers of users enrolled therein.

By virtue of associating the service provider user identifier with the resources of a respective authorized user in the SPC system 12, and including the service provider user identifier in the enrollment data record of the authorized user, the service provider user identifier maps resources stored in the SPC system 12 that are associated with the service provider user identifier, to data stored in the AC system 14 associated with the same service provider user identifier.

Figure 2:
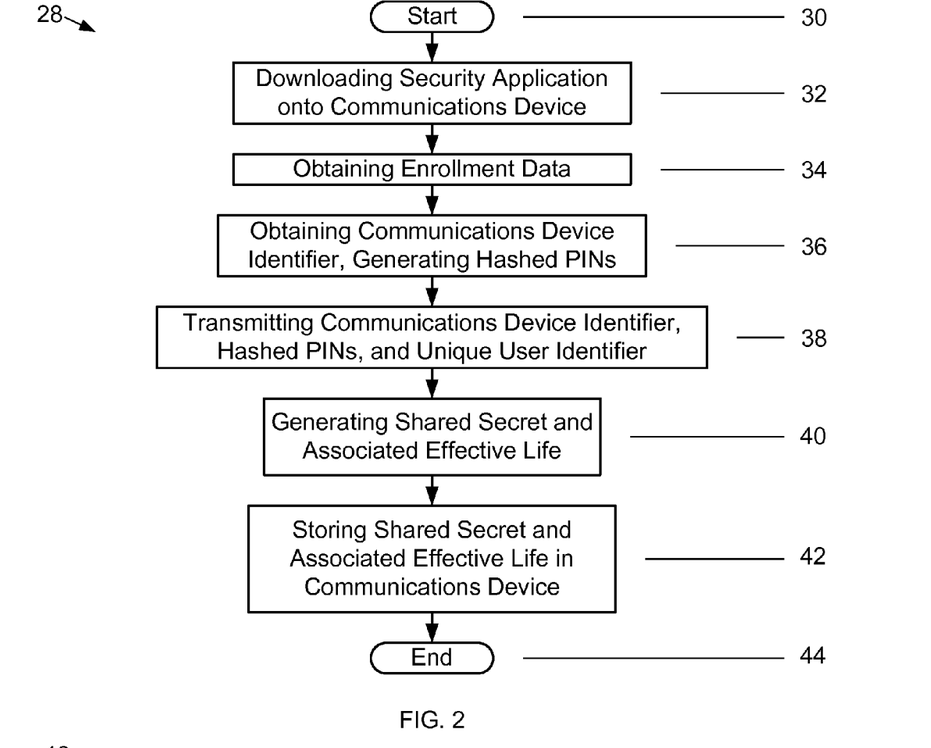
FIG. 2 is a flowchart illustrating an exemplary network-based process for enrolling authorized users in an authentication computer system.

FIG. 2 is a flowchart 28 illustrating an exemplary network-based process used by the TMC system 10 for enrolling authorized users in the AC system 14. For TMC system 10 the process starts 30 when a user of the communications device 18 desires to be able to access resources stored in the SPC system 12 from the computing device 16. Specifically, the user obtains the communications device 18 and continues by downloading 32 a security application onto the communications device 18 from an applications store available on the Internet. Alternatively, the security application may be obtained in any manner including, but not limited to, from a static html web page, from an e-mail, or from a compact disk provided by an entity associated with the security application.

After downloading the security application 32, the security application causes the communications device 18 to continue processing by displaying a message on the screen 26 prompting the user to obtain enrollment data. The enrollment data that may be obtained includes at least enrollment biometric data, a PIN, a duress PIN, a unique user identifier of the user, a service provider identifier and a service provider user identifier. The user continues processing by obtaining the enrollment data 34 with the communications device 18. The PIN and the duress PIN are four digit numbers determined by the user during enrollment and thus are known only to the user. The unique user identifier is an eight character alphanumeric text string also determined by the user during enrollment and thus also known only to the user. Alternatively, the PIN and the duress PIN may be alphanumeric text strings including any number of characters, and the unique user identifier may include any number of characters or may be the same as the service provider identifier. Moreover, the PIN, the duress PIN, and the unique user identifier may be supplied to the user by the application store. The service provider identifier is an alphanumeric character string that functions to identify a service provider, and the service provider user identifier is an alphanumeric text string that identifies a user enrolled in a respective service provider. For example, the service provider user identifier may be a credit card number. The service provider user identifier may be the same or different than the unique user identifier.

After obtaining the enrollment data 34, the security application causes the communications device 18 to continue processing by obtaining its EIN and communications device identifier 36. The EIN may be an alphanumeric text string including any number of characters or may be a four digit number. Next, the security application causes the communications device 18 to continue processing by generating 36 a hashed PIN and a hashed duress PIN from the entered PIN and duress PIN, respectively, discarding the entered PIN and the entered duress PIN, and transmitting 38 the communications device identifier, the hashed PIN, the hashed duress PIN, the EIN, the enrollment biometric data, the unique user identifier, the service provider identifier, and the service provider user identifier to the AC system 14 for storage therein. Next, the AC system 14 continues processing by generating 40 a shared secret and an associated effective life of the shared secret, storing the shared secret and effective life in the enrollment data record of the enrolling user, and transmitting the shared secret and the associated effective life to the communications device 18. The communications device 18 continues processing by storing 42 the shared secret and the associated effective life therein. Next, processing ends 44.

Although the obtained PIN and duress PIN are discarded in the exemplary enrollment process, in alternative enrollment processes the entered PIN and duress PIN may not be discarded and instead may be stored in the AC system 14.

Although the unique user identifier, the PIN, and the duress PIN are determined by the user and transmitted 38 to the AC system 14 from the communications device 18 in the exemplary enrollment process, in alternative processes the unique user identifier, the PIN, and the duress PIN may not be determined by the user and not transmitted 38 to the AC system 14. In such alternative enrollment processes, in response to receiving the transmitted enrollment data, the AC system 14 generates the unique user identifier, the PIN, and the duress PIN, includes them in the enrollment data record, and transmits them with the shared secret and effective life to the communications device 18. Moreover, in such alternative processes the EIN may not be transmitted to the AC system 14 from the communications device 14. Instead, the AC system 14 may generate the EIN, include the EIN in the enrollment data record, and transmit the EIN with the unique user identifier, the PIN, and the duress PIN to the communications device 18 for storage therein.

In yet other alternative enrollment processes, after the transmitting operation 38, the AC system 14 continues processing by determining whether the enrolling user was previously enrolled therein. The unique user identifier transmitted 38 from the communications device 18 and received by the AC system 14 is referred to herein as a received unique user identifier. Specifically, the AC system 14 continues by comparing the received unique user identifier against previously enrolled unique user identifiers stored therein. When the received unique user identifier matches a previously enrolled unique user identifier, the enrolling user is already enrolled therein. However, when the received unique user identifier does not match a previously enrolled unique user identifier, the AC system 14 transmits the received unique user identifier to the SPC system 12 which determines whether the enrolling user is authorized to enroll in the AC system 14. For example, the SPC system 12 may include a list of unique user identifiers that each correspond to a user authorized to access the resources stored therein and thus is authorized to enroll in the AC system 14. When the received unique user identifier matches a listed unique user identifier, the SPC system 12 determines that the enrolling user is authorized to enroll in the AC system 14. Next, the SPC system 12 notifies the AC system 14 that the enrolling user is authorized to enroll therein. Otherwise, when the received unique user identifier does not match a listed unique user identifier, the user cannot enroll.

The enrollment biometric data, the PIN, the duress PIN, the hashed PIN, and the hashed duress PIN are not stored in the communications device 18 due to security concerns. Specifically, by virtue of being a relatively small and portable device the communications device 18 may be easily lost or stolen. When the communications device 18 is stolen, any confidential data stored therein may be discovered. Thus, if confidential data such as a hashed PIN is stored in the communications device 18, the hashed PIN may be discovered and used to authenticate an unauthorized user. By storing the hashed PINs in the AC system 14, separate from the communications device 18, the security of the hashed PINs is facilitated to be enhanced such that unauthorized users cannot obtain the hashed PINs to conduct fraudulent network-based transactions.

Although the communications device 18 generates the hashed PIN and hashed duress PIN in the exemplary enrollment process, in alternative enrollment processes the AC system 14 may generate the hashed PIN and hashed duress PIN. In such alternative processes, the communications device 18 may be used to obtain the enrollment biometric data, the PIN and the duress PIN from the authorized user, and transmit the captured PIN, the captured duress PIN, the enrollment biometric data, the EIN, the unique user identifier, the communications device identifier, the service provider identifier, and the service provider user identifier to the AC system 14. In response, the AC system 14 continues processing by generating the hashed PIN and the hashed duress PIN from the PIN and the duress PIN, respectively, storing at least the hashed PINS therein, and discarding the received PIN and duress PIN. However, in other alternative enrollment processes the received PIN and duress PIN may be stored in the AC system 14.

Figure 3:
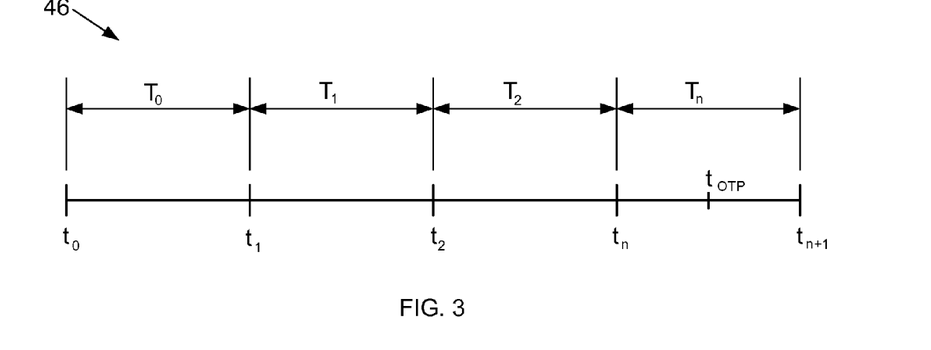
FIG. 3 is a diagram illustrating time intervals used for computing one-time passwords.

FIG. 3 is a diagram 46 illustrating a plurality of sequential thirty second time intervals $T_n$ defined by the password generating application and used by the password generating application for computing OTPs. More specifically, each time interval $T_n$ has a beginning time $t_n$ and an ending time $t_{n+1}$ separated by thirty seconds. Thus, each time interval $T_n$ is thirty seconds. Alternatively, each time interval $T_n$ may be any time duration that facilitates generating OTPs as described herein.

A time $t_{OTP}$ is the time at which a request for an OTP is made by a user. When computing an OTP, the password generating application may determine the thirty second time interval $T_n$ that includes the time $t_{OTP}$ and compute the OTP using the beginning time $t_n$ of the determined time interval $T_n$. Alternatively, the password generating application may use any time included in the determined time interval $T_n$ when computing OTPs. The designation "n" as used in conjunction with the time intervals $T_n$ and the times $t_n$ is intended to indicate that any number "n" of time intervals, T, and of corresponding times, t, may be used that facilitates generating OTPs.

Figure 4:
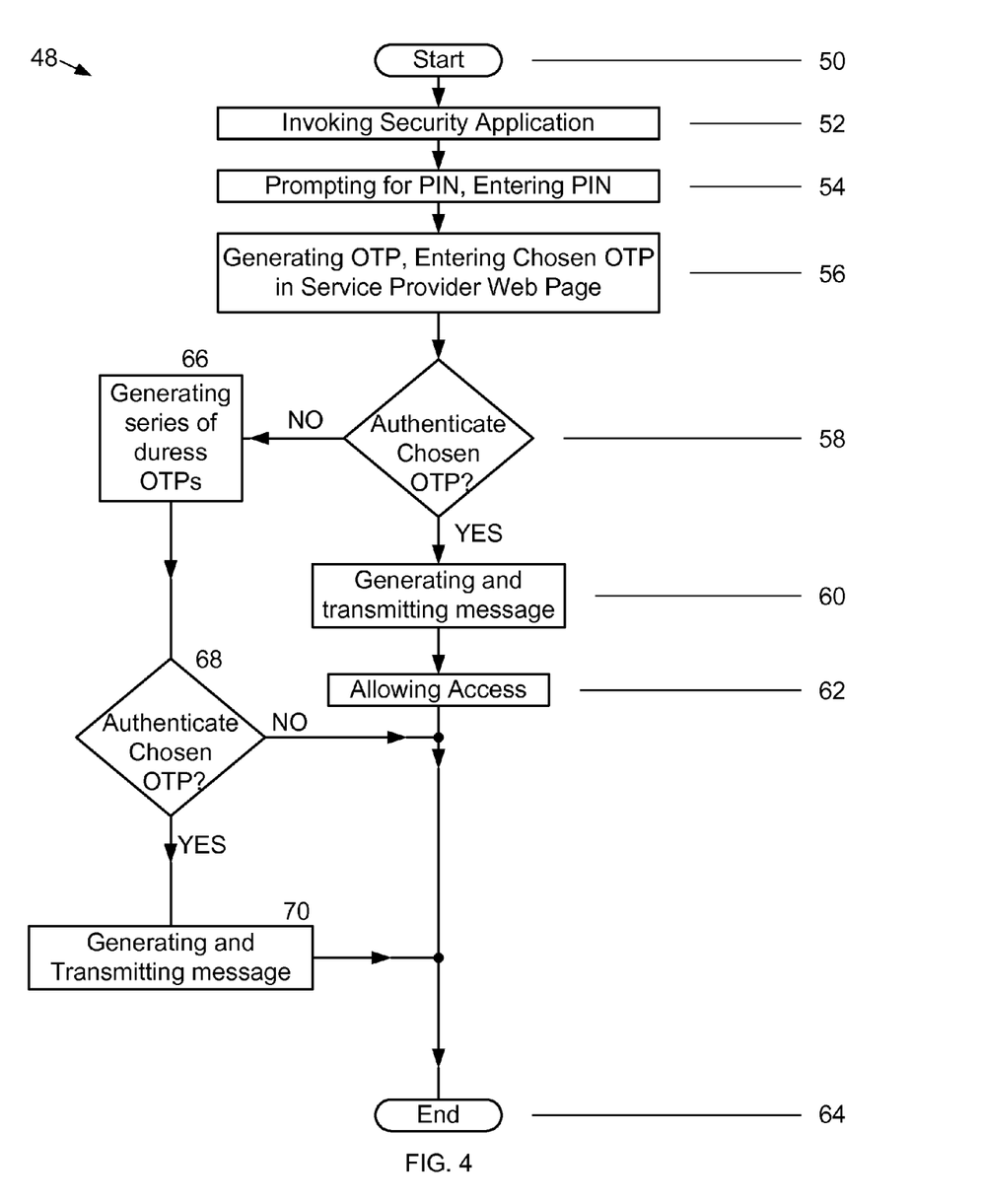
FIG. 4 is a flowchart illustrating an exemplary authentication process for authenticating a user requesting access to resources over a network.

FIG. 4 is a flowchart 48 illustrating an exemplary authentication process used by the TMC system 10 for authenticating a user requesting access to resources stored in the SPC system 12 over a network from the computing device 16. The authentication process starts 50 when a user navigates to a web page of a financial institution service provider from the computing device 16 and requests accessing resources associated with the user from the SPC system 12. The user is prompted to enter an OTP into the service provider web page. Next, the user continues by activating 52 a button or icon 24 for invoking 52 the security application in the communications device 18 which causes the communications device 18 to continue by displaying a message on the screen 26 prompting 54 the user to enter his PIN. In response, the user continues by entering 54 his PIN into the communications device 18. By activating 52 the button or icon in response to the prompt for the OTP, the user also requests an OTP.

The communications device 18 continues by retrieving the shared secret stored therein, generating a hash of the PIN, and combining the hashed PIN with the shared secret to generate a modified shared secret. Next, the communications device 18 continues by generating 56 an OTP with the modified shared secret and the time $t_{OTP}$ at which the OTP was requested, and by displaying the OTP on the screen 26 for the user to see. The password generating application causes the communications device 18 to periodically update the OTP at a time interval defined within the password generating application as thirty seconds. Thus, the OTP is updated, and the updated OTP is displayed on the screen 26 for the user to see, every thirty seconds. Alternatively, any time interval deemed suitable for authenticating users with OTPs may be used. Each updated OTP is different. The communications device 18 ceases updating the OTP when the user chooses an OTP. In alternative authentication processes, the password generating application causes the communications device 18 to cease updating the OTP after a period of time, defined within the password generating application, has elapsed since generating a first one of the OTPs.

After reading the screen 26, the user continues by choosing one of the OTPs displayed on the screen 26 and entering 56 the chosen OTP into the financial institution service provider web page. Next, the SPC system 12 continues processing by transmitting the chosen OTP to the AC system 14, and the AC system 14 continues by authenticating 58 the chosen OTP. More specifically, the AC system 14 continues by determining its own system time, a first time at two-and-a-half minutes before the system time, and a second time at two-and-a-half-minutes after the system time. Next, the AC system 14 continues processing by determining the difference between the first and second times, dividing the time difference into thirty second intervals of time, and generating a different OTP for each thirty second interval. The time difference is five minutes which equates to ten-thirty second time intervals. Thus, ten different OTPs are generated that constitute a series of OTPs. Each OTP included in the series of OTPs is generated using the modified shared secret based on the PIN and the beginning time of each respective thirty second time interval. Alternatively, the first and second times may be determined at any time interval from the system time of AC system 14. Moreover, the time difference may be divided into intervals of time of any duration such that any number of OTPs may be generated and included in the series of OTPs.

Next, the AC system 14 continues by comparing 58 the chosen OTP against each of the OTPs included in the series of OTPs. When the chosen OTP matches an OTP included in the series of OTPs, the AC system 14 continues processing by generating and transmitting a message 60 to the SPC system 12 indicating that the user has been authenticated and permitting the user to access resources associated with the user in the SPC system 12. In response, the SPC system 12 continues processing by allowing 62 the user to, from the computing device 16, access resources stored therein that are associated with the user. Next, processing ends 64.

However, when the chosen OTP does not match 58 an OTP included in the series of OTPs, the AC system 14 continues processing by generating 66 a series of duress OTPs in a substantially similar manner as described herein for generating the series of OTPs. Each duress OTP included in the series of duress OTPs is generated using the modified shared secret based on the duress PIN and the beginning time of each respective thirty second time interval.

Next, the AC system 14 continues processing by authenticating 68 the chosen OTP by comparing 68 the chosen OTP against each of the duress OTPs. If the chosen OTP does not match a duress OTP, processing ends 64. However, when the chosen OTP matches a duress OTP, it is evident that the duress PIN of the user was entered into the communications device 18 at operation 54. Thus, processing continues by determining that the user is operating under duress, and generating and transmitting a message 70 to the SPC system 12 indicating that the user is operating under duress. Next, the SPC system 12 continues by determining an appropriate action to take in response to learning that the user is operating under duress, and processing ends 64. For example, the SPC system 12 may continue processing by prohibiting the user from accessing resources and by notifying local law enforcement of a possible emergency situation, after which processing ends 64.

Although the shared secret is combined with the hashed PIN to generate the modified shared secret in the exemplary authentication process, the shared secret may alternatively be combined with the PIN or with a combination of the PIN and hashed PIN to form the modified shared secret. In yet other alternative exemplary authentication processes, the shared secret may be replaced and the replaced shared secret may be combined with the hashed PIN, the PIN, or with a combination of the PIN and the hashed PIN to generate the modified shared secret.

The effective life of each shared secret is the period of time within which the shared secret may be used as an input in the password generating application. After the effective life expires, the expired shared secret is to be replaced with a new shared secret generated by the AC system 14. The effective life of each shared secret is thirty days. However, the effective life may be any period of time deemed suitable for authenticating users as described herein. Moreover, the effective life may be adjusted for each user or for specific users to be greater than or less than thirty days.

Figure 5:
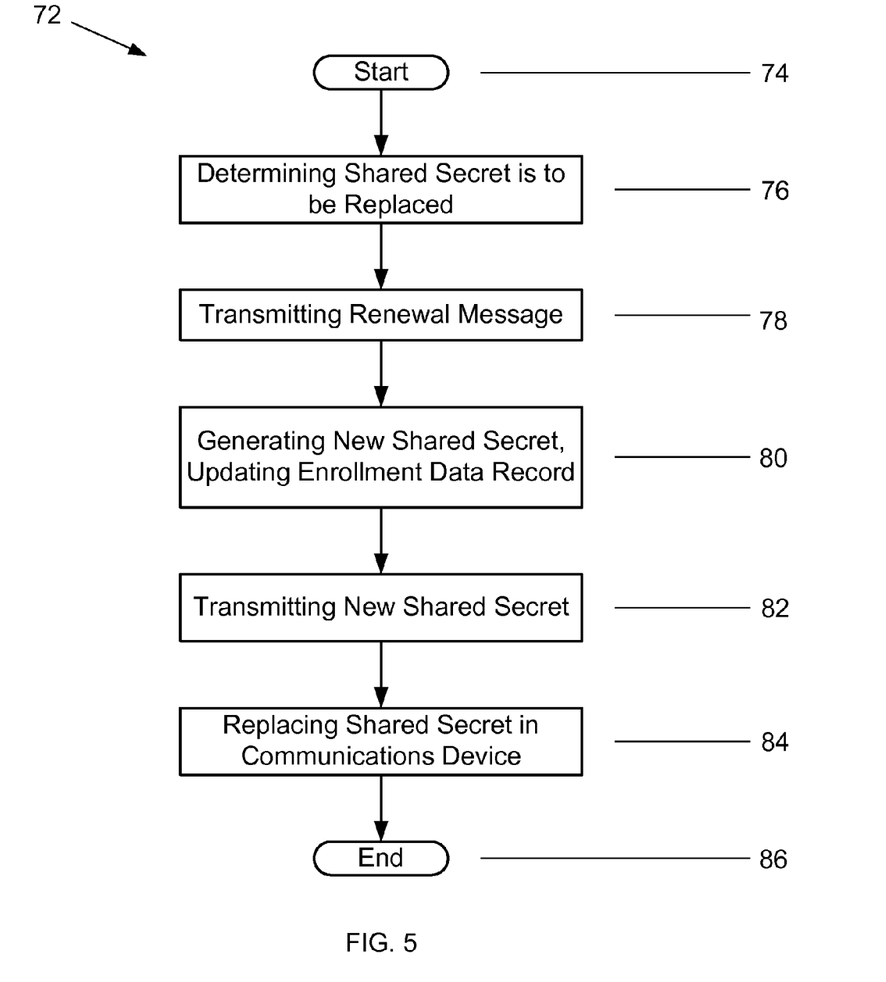
FIG. 5 is a flowchart illustrating an exemplary replacement process for replacing an expired shared secret.

FIG. 5 is a flowchart 72 illustrating an exemplary replacement process used by the TMC system 10 for replacing an expired shared secret. The replacement process starts 74 with the communications device 18 determining 76 that a shared secret is to be replaced because it has expired, and then transmitting 78 a renewal message to the AC system 14 requesting a new shared secret and associated effective life. In response, the AC system 14 continues by generating 80 a new shared secret and associated effective life, and updating 80 the enrollment data record of the user associated with the communications device 18. The AC system 14 updates 80 the enrollment data record by replacing the expired shared secret and associated effective life therein with the new shared secret and associated effective life. Next, the AC system 14 continues by transmitting 82 the new shared secret and associated effective life to the communications device 18. After receiving the new shared secret and associated effective life, the communications device 18 continues processing by replacing 84 the expired shared secret and associated effective life therein with the new shared secret and associated effective life. Next, processing ends 86.

The shared secret and associated effective life may be replaced prior to expiration of the effective life when it is determined that a security breach has occurred or that a security breach could have occurred. A security breach occurs when at least one shared secret is obtained by an unauthorized user. Security breaches, as well as suspected security breaches, may be discovered by at least the AC system 14, the communications device 18, or the SPC system 12 themselves. Moreover, the operator of the SPC system 12, the operator of the AC system 14, and the user of the communications device 18 may determine that a security breach could have occurred in their respective systems and devices. For example, the SPC system operator may determine that a security breach of the SPC system could have occurred when unauthorized transactions occur. The AC system operator may determine that a security breach of the AC system could have occurred upon discovering a disclosure of at least one shared secret stored in the AC system 14. The communications device user, after noticing an unexpected change in the device 18 such as a ringtone change, may have reason to believe and to thus determine that a security breach of the communications device could have occurred.

Figure 6:
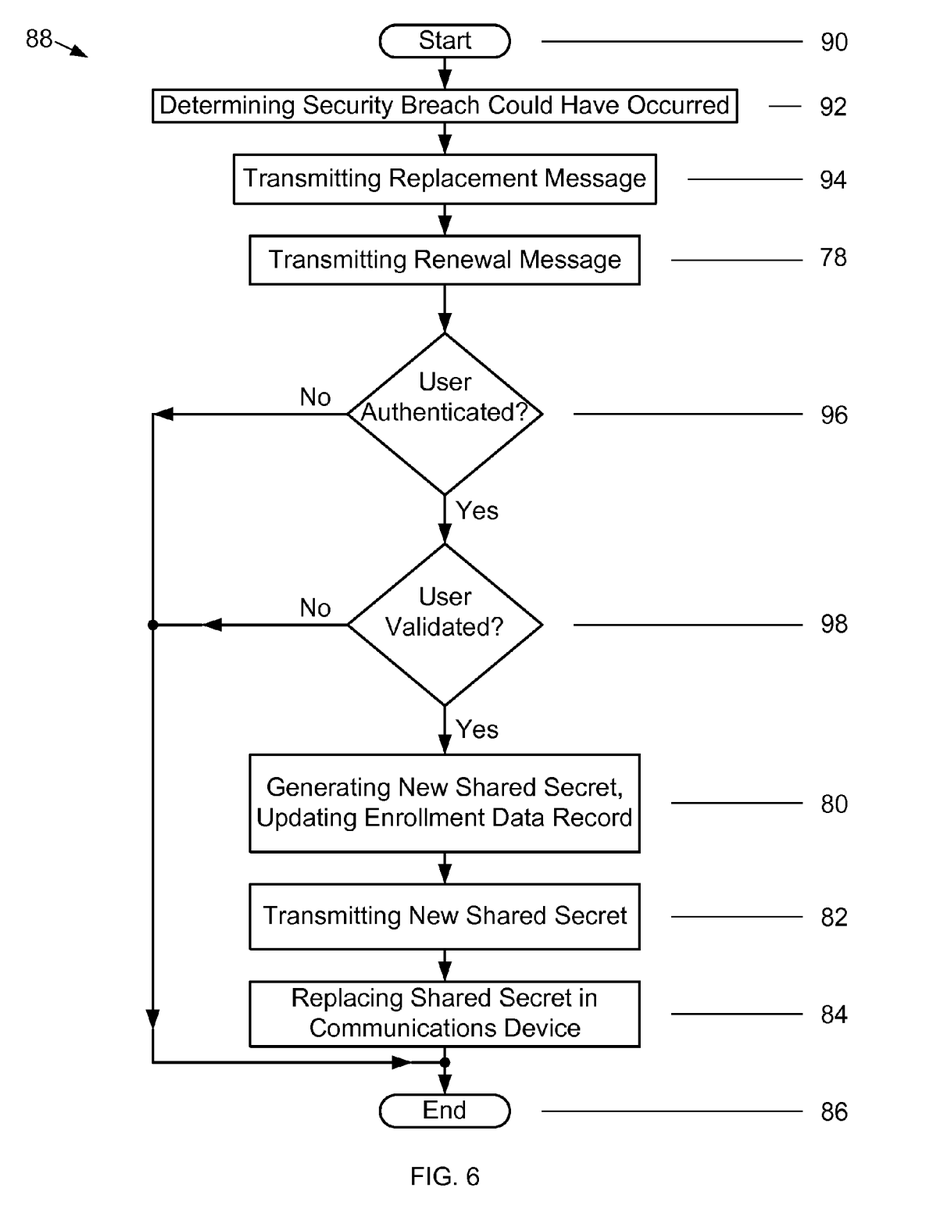
FIG. 6 is a flowchart illustrating an alternative exemplary replacement process for replacing shared secrets that may have been compromised as the result of a security breach at an authentication computer system.

The information shown in FIG. 6 is the same information shown in FIG. 5 as described in more detail below. As such, operations illustrated in FIG. 6 that are identical to operations illustrated in FIG. 5 are identified using the same reference numerals used in FIG. 5.

FIG. 6 is a flowchart 88 illustrating an alternative exemplary replacement process used by the TMC system 10 for replacing at least one shared secret that may have been compromised as a result of a security breach at the AC system 14. This alternative replacement process is similar to that shown in FIG. 5. However, after determining that a security breach of the AC system 14 could have occurred, the AC system continues by transmitting a replacement message to the SPC system 12. Moreover, the user is biometrically authenticated and validated prior to generating the new shared secret. More specifically, this alternative exemplary replacement process starts 90 by determining that at least one shared secret is to be replaced after determining 92 that a security breach of the AC system 14 could have occurred. After determining 92 that a security breach could have occurred, processing continues by changing the associated effective life of each shared secret to cause each shared secret stored in the AC system 14 to immediately expire, and transmitting 94 a replacement message to the SPC system 12. The replacement message is for notifying users that a security breach could have occurred and indicates that each user is required to obtain a new shared secret and associated effective life.

Next, the SPC system 12 continues processing by transmitting the replacement message to the computing device 16. When the user next operates the computing device 16, the computing device 16 continues processing by displaying the replacement message for the user to see. After reading the replacement message, the user continues by activating a button or icon 24 for invoking the security application in the communications device 18. The security application causes the communications device 18 to continue processing by transmitting a renewal message 78 to the AC system 14 requesting a new shared secret and associated effective life.

In response, the AC system 14 continues by authenticating 96 the user. More specifically, the AC system 14 continues by generating an authentication request identifying biometric data to be captured from the user, and transmitting the request to the communications device 18. The biometric data to be captured is voice biometric data. Next, the communications device 18 displays the biometric data to be captured on the screen 26 for the user to see. After reading the screen 26, the user continues by capturing biometric data in accordance with the authentication request using the communications device 18. The communications device 18 continues processing by transmitting the captured biometric data to the AC system 14 for authentication. Next, the AC system 14 continues by processing the captured biometric data and comparing the processed biometric data against the enrollment biometric data of the user. When the processed biometric data does not match the enrollment biometric data of the user the user is not authenticated 96, and processing ends 86.

However, when the processed biometric data matches the enrolled biometric data, the user is successfully authenticated 96 and the AC system 14 continues processing by generating a one-time authentication code and transmitting the one-time authentication code to the SPC system 12. Next, the SPC system 12 transmits the one-time authentication code to the computing device 16. In response, the computing device 16 continues processing by displaying the one-time authentication code for the user to see. After reading the one-time authentication code from the computing device 16, the user continues by entering the one-time authentication code in the communications device 18. The device 18 continues processing by transmitting the entered one-time authentication code to the AC system 14. Next, the AC system 14 continues processing by validating 98 the entered one-time authentication code. More specifically, the AC system 14 continues by comparing the entered one-time authentication code against the one-time authentication code transmitted from the AC system 14 to the computing device 16. When the one-time authentication codes do not match the user is not validated 98 and processing ends 86. Otherwise, the user is validated 98 and processing continues as described in operations 80-86 of the exemplary replacement process.

Although voice biometric data is captured and used for authentication in the alternative exemplary replacement process, in other alternative replacement processes biometric data of any other biometric modality may be captured and used as the basis of authenticating the user. Such other biometric modalities include, but are not limited to, finger, face, iris, and palm. Moreover, although the user is biometrically authenticated in the alternative exemplary replacement process, in other alternative replacement processes the identity of the user may be authenticated based on any type of knowledge-based data including, but not limited to, a PIN and a password.

Although the one-time authentication code is transmitted from the SPC system 12 to the computing device 16, and is displayed on the computing device 16 for the user to see in the alternative exemplary replacement process, in other alternative replacement processes the one-time authentication code may be transmitted from the AC system 14 to the communication device 18 for display on the screen 26. In such other alternative replacement processes, after reading the one-time authentication code from the screen 26, the user enters the one-time authentication code in the communications device 18 which then continues by transmitting the entered one-time authentication code to the AC system 14. The AC system 14 then continues by comparing the entered one-time authentication code against the one-time authentication code transmitted to the communications device 18. When the one-time authentication codes do not match, the user is not validated and processing ends 86. Otherwise, the user is validated and processing continues as described in operations 80-86 of the exemplary replacement process.

Although the alternative exemplary replacement process biometrically authenticates 96 and then validates 98 the user prior to generating the new shared secret after determining that a security breach could have occurred, in other alternative replacement processes the AC system 14 may skip the authentication 96 and validation 98 operations and continue processing by generating the new shared secret 80 immediately after receiving the renewal message. Processing would continue as described in operations 82-86 of the exemplary replacement process.

In the alternative exemplary replacement process, it is determined that a security breach could have occurred at the AC system 14. However, in other alternative replacement processes it may be determined that a security breach could have occurred at the communications device 18.

Figure 7:
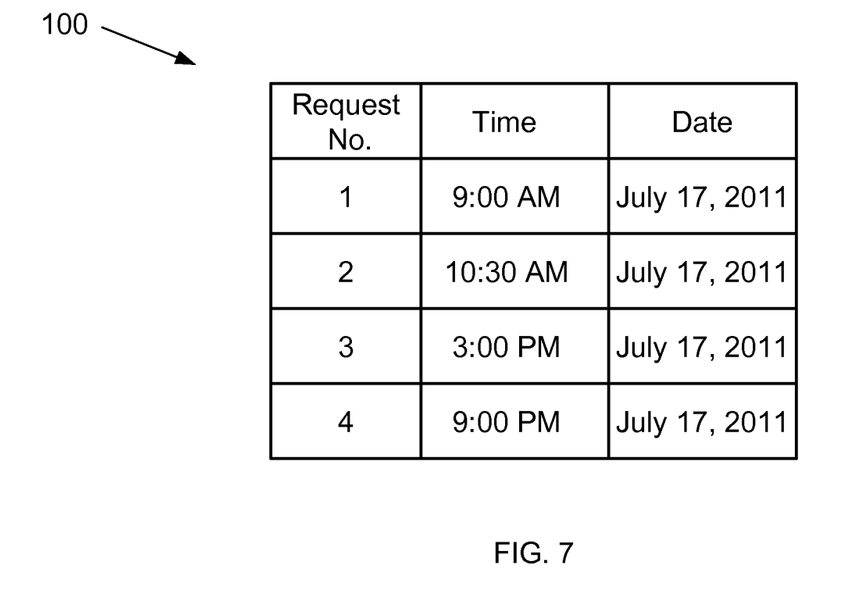
FIG. 7 is a diagram illustrating an exemplary record of one-time password requests.

FIG. 7 is a diagram illustrating an exemplary record 100 of OTP requests that is stored in the communications device 18. The record 100 includes an OTP request number for each OTP request, and a corresponding time and date. The requests are recorded sequentially in the order in which they are made on the communications device 18. Consequently, each OTP request should have a preceding request that has an earlier time and date. For example, request number 3 is the preceding request of request number 4. Accordingly, the time and date of request number 3 is before that of request number 4.

Figure 8:
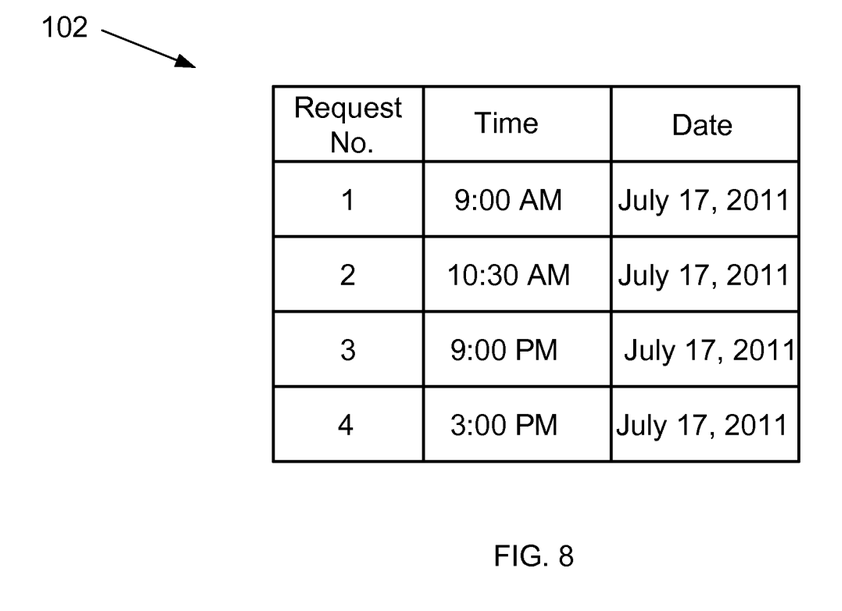
FIG. 8 is a diagram illustrating an alternative exemplary record of one-time password requests.

The information shown in FIG. 8 is substantially the same information shown in FIG. 7, as described in more detail below. As such, information illustrated in FIG. 8 that is identical to information illustrated in FIG. 7 is identified using the same reference numerals used in FIG. 7.

FIG. 8 is a diagram illustrating an alternative exemplary record 102 of OTP requests similar to the record 100 shown in FIG. 7. However, a time abnormality is included in the record 102 because the time and date of request number 4 are before those of request number 3. When a user requests an OTP using the communications device 18, the communications device 18 continues by at least determining a current time and date at which the request is made. Moreover, the communications device 18 continues by checking for time abnormalities by comparing the current time and date against the time and date of the preceding OTP request. A time abnormality is when the current time and date are earlier than the time and date of the preceding request. Time abnormalities may indicate that an imposter obtained the communications device 18, changed the system time of the device 18 to be different than a current time, requested an OTP based on the changed system time, and then changed the system time back to the current time after receiving the OTP. Thus, such a time abnormality may be interpreted as a security breach in which an imposter is attempting to surreptitiously obtain an OTP for use in fraudulently accessing resources in the SPC system 12. Consequently, when a time abnormality occurs in the record 102, the communications device 18 continues by determining that a security breach of the communications device 18 could have occurred and the shared secret is to be replaced, and attempts to thwart any possible fraudulent transactions involving the resources stored in the SPC system 12 by automatically initiating a shared secret and associated effective life replacement process.

Although the communications device 18 is configured to check for time abnormalities each time an OTP request is made, the communications device 18 may alternatively be configured to periodically check for time abnormalities automatically. For example, the communications device 18 may check for time abnormalities every 15 minutes.

Figure 9:
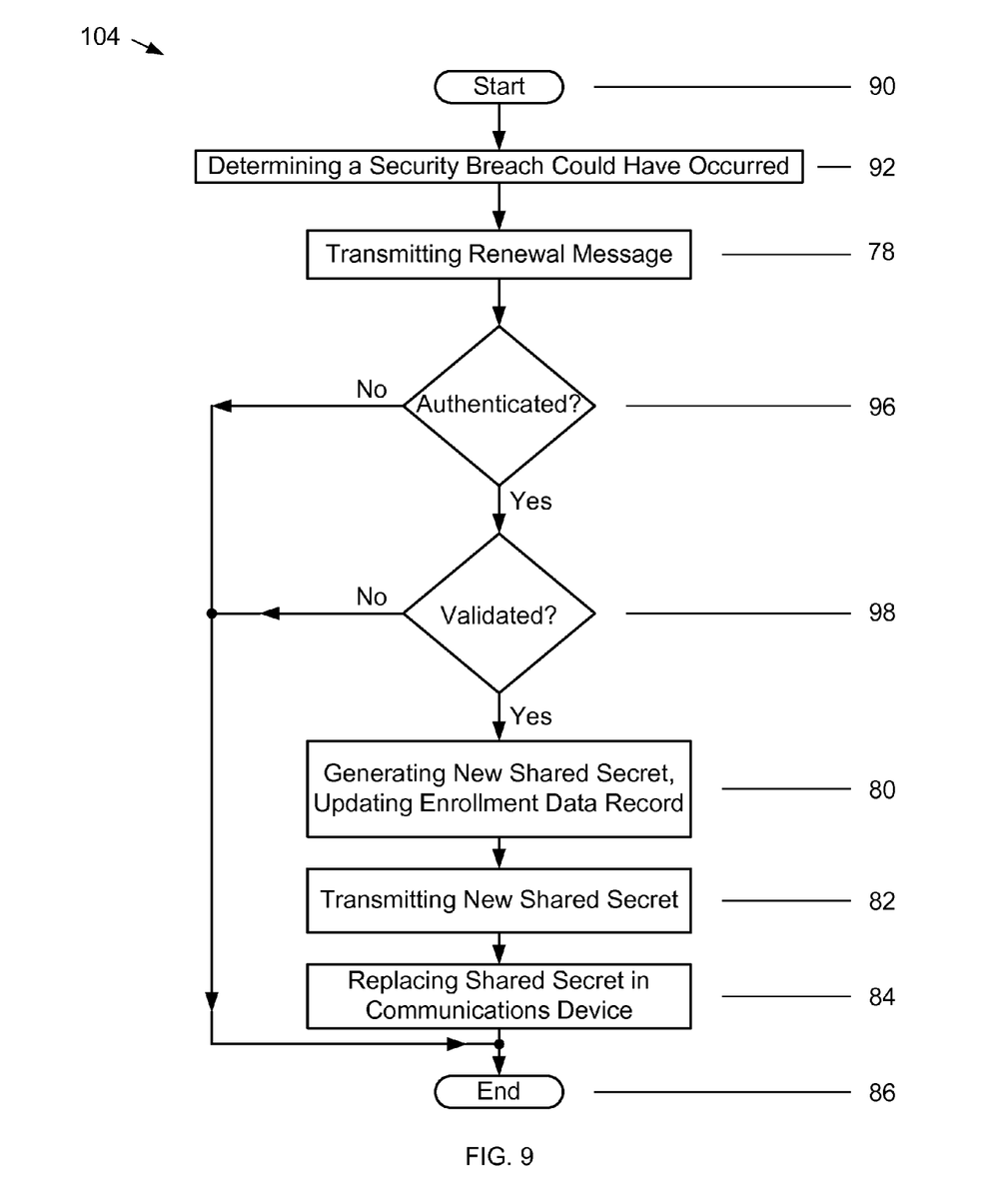
FIG. 9 is a flowchart illustrating another alternative exemplary process for replacing shared secrets that may have been compromised as a result of a security breach at a communications device.

The information shown in FIG. 9 is the same information shown in FIG. 6 as described in more detail below. As such, operations illustrated in FIG. 9 that are identical to operations illustrated in FIG. 6 are identified using the same reference numerals used in FIG. 6.

FIG. 9 is a flowchart 104 illustrating another alternative exemplary replacement process used by the TMC system 10 for replacing at least one shared secret that may have been compromised as a result of a security breach. This alternative exemplary replacement process is similar to that shown in FIG. 6. However, the security breach occurs at the communications device 18 so a replacement message is not transmitted from the AC system 14. Thus, this alternative exemplary replacement process starts 90 by determining that the at least one shared secret is to be replaced after determining 92 a security breach could have occurred in the communications device 18. The communications device 18 determines that a security breach could have occurred therein. After determining 92 that a security breach could have occurred therein, the communications device 18 continues processing by transmitting 78 a renewal message to the AC system 14 requesting a new shared secret and associated effective life. Next, processing continues as described in operations 96, 98, and 80-86 of the alternative exemplary replacement process.

Upon determining that a security breach could have occurred in the communications device 18, the communications device 18 may not be able to communicate with the AC system 14 over the network 22 and thus cannot transmit a renewal message to the AC system 14. For example, the communications device 18 may be operating in a mode in which the second communications network 22 is explicitly disabled and is thus not able to communicate with the AC system 14.

Figure 10:
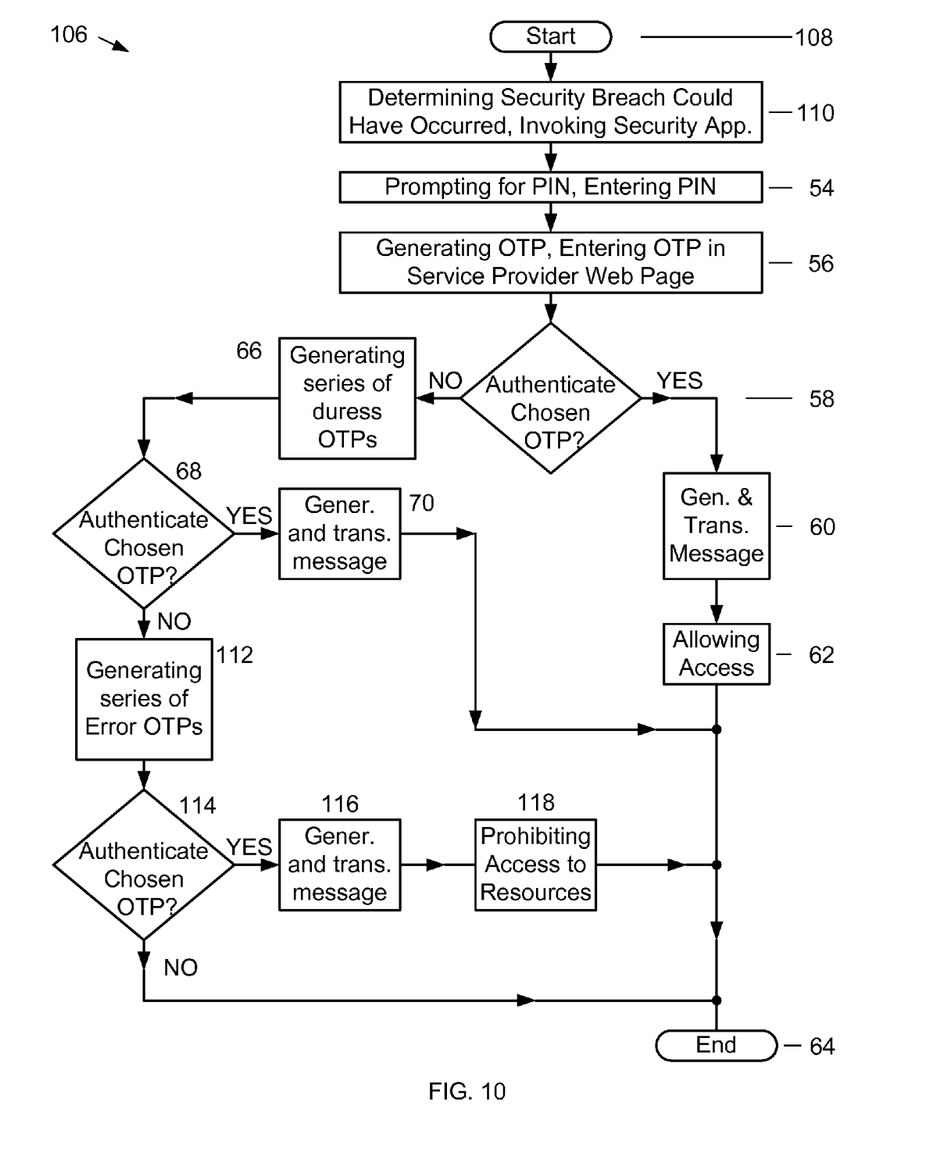
FIG. 10 is a flowchart illustrating an alternative exemplary authentication process for notifying the authentication computer system of a possible security breach at the communications device.

The information shown in FIG. 10 is the same information shown in FIG. 4 as described in more detail below. As such, operations illustrated in FIG. 10 that are identical to operations illustrated in FIG. 4 are identified using the same reference numerals used in FIG. 4.

FIG. 10 is a flowchart 106 illustrating an alternative exemplary authentication process used by the TMC system 10 for notifying the AC system 14 of a possible security breach at the communications device 18, when the communications device 18 is unable to communicate with the AC system 14. More specifically, the alternative exemplary authentication process starts 108 after determining 110 that a security breach could have occurred in the communications device 18. However, because the communications device 18 is unable to communicate with the AC system 14, the communications device 18 cannot transmit a renewal message to the AC system 14 requesting a new shared secret and associated effective life. When the user next navigates to a web page of the financial institution service provider from the computing device 16, after it has been determined that a security breach could have occurred, and requests accessing resources associated with the user from the SPC system 12, the user is prompted to enter an OTP into the service provider web page.

Next, the user activates a button or icon 24 for invoking 110 the security application in the communications device 18 which causes the communications device 18 to continue by displaying a message on the screen 26 prompting 54 the user to enter his PIN. By activating the button or icon in response to the prompt for the OTP, the user also requests an OTP. In response, the user continues by entering 54 his PIN into the communications device 18. However, because a security breach could have occurred at the device 18, the communications device 18 does not use the entered PIN for generating the modified shared secret. Instead, the communications device 18 uses the EIN stored therein for generating the modified shared secret. Consequently, after the PIN is entered the communications device 18 continues by retrieving the shared secret and EIN stored therein, and combining the EIN with the shared secret to generate the modified shared secret.

Next, processing continues as described in operations 56-70 of the exemplary authentication process. However, when the chosen OTP does not match 68 a duress OTP included in the series of duress OTPs, processing continues by generating 112 a series of error OTPs in a substantially similar manner as described in the exemplary authentication process for generating the series of OTPs. However, each error OTP included in the series of error OTPs is generated by the AC system 14 using a modified shared secret based on the EIN and the beginning time of each respective thirty second time interval.

Next, the AC system 14 continues processing by authenticating 114 the chosen OTP by comparing 114 the chosen OTP against each of the error OTPs. If the chosen OTP does not match an error OTP, processing ends 64. However, when the chosen OTP matches an error OTP, the AC system 14 determines that the EIN of the communications device 18 was used to generate the chosen OTP, and continues processing by generating and transmitting 116 a message to the SPC system 12 indicating that access to resources associated with the user is prohibited. The SPC system 12 continues by immediately prohibiting access 118 to the resources associated with the user until a new shared secret and effective time replacement process occurs. Next, processing ends 64.

It should be appreciated that the exemplary authentication process described herein facilitates increasing the trust in authentication results that indicate a user attempting to access network-based resources from a service provider is an authorized user. Moreover, it should be appreciated that the exemplary replacement processes described herein facilitate easily, quickly, and inexpensively replacing shared secrets and their associated effective lives. By virtue of using easily replaceable shared secrets instead of using difficult to replace shared secrets and combining the replaceable shared secret with a knowledge-based attribute when generating an OTP, additional security is provided which enhances trust in authentication results indicating that a user is an authorized user. Moreover, providing a duress PIN to each user facilitates reducing the number of coerced accesses to resources by unauthorized users or imposters. Furthermore, using an EIN instead of a hashed PIN to generate the modified shared secret facilitates reducing unauthorized access to resources. By implementing a higher authentication standard, it is more difficult for an imposter to be authenticated as an authorized user. Thus, by virtue of facilitating an increase in trust in an authentication result that indicates a user is an authorized user, the processes and systems described herein facilitate increasing the security of service provider resources accessible over networks.

The processes and systems described herein facilitate increasing the level of trust in authentication transactions conducted over networks prior to accessing resources from service providers over such networks, and thus facilitate reducing the likelihood that imposters will be granted access to such resources. Moreover, by virtue of using easily replaceable shared secrets, the processes and systems described herein facilitate reducing the time and costs associated with changing a shared secret after the shared secret may have been compromised as the result of a security breach. Furthermore, by virtue of including a duress PIN, the processes and systems described herein facilitate reducing the number of unauthorized accesses due to coercion.

In each embodiment, the above-described processes facilitate increasing the likelihood that a user attempting to access a service provider resource over a network is an authorized user, and facilitate reducing operating costs incurred by service providers for protecting such resources against imposters. In exemplary embodiments described herein, a user attempting to access service provider resources over a network provides a PIN which is hashed and combined with a shared secret to generate a modified shared secret. An OTP is generated on a communications device using the modified shared secret and the time of requesting the OTP. The user enters the generated OTP into a computing device, the OTP is authenticated, and upon successful authentication the user is granted access to the resources. Moreover, in exemplary embodiments described herein, when the shared secret has been, or is suspected of being, compromised due to a security breach at an authentication system, each shared secret in the authentication system and in a communications device immediately expires and is to be replaced. The user causes the communications device to request a new shared secret and an associated effective life from the authentication system. After successfully authenticating and validating the user, the authentication system generates a new shared secret and associated effective life, stores the new shared secret and associated effective life therein, and transmits the new shared secret and associated effective life to the communications device for storage therein.

Exemplary embodiments of authentication processes and systems that facilitate increasing the trust in network-based authentication results, reducing the time and costs associated with replacing shared secrets, and notifying service providers of users operating under duress are described herein. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method for authenticating users comprising:
   requesting a one-time password and determining a time the request was made;
   comparing the request time against a previous request time;
   when the request time is after the previous request time, entering a personal identification number into a communications device, the personal identification number being transmitted during an enrollment process from the device to an authentication system for storage therein;
   retrieving, by the communications device, a shared secret stored therein;
   generating a hashed personal identification number from the personal identification number;
   generating a modified shared secret; and
   generating a one-time password with the modified shared secret and the request time.

2. A method in accordance with claim 1, said generating a modified shared secret step comprising combining the hashed personal identification number with the shared secret.

3. A method in accordance with claim 1, further comprising:
   reading the one-time password from the communications device;
   entering the one-time password in a service provider web page operated by a service provider computer system;
   transmitting the one-time password from the service provider computer system to an authentication system; and
   authenticating the one-time password.

4. A method in accordance with claim 3, further comprising:
   updating the one-time password periodically and displaying the updated one-time password on the communications device;
   choosing a displayed one-time password; and
   entering the chosen one-time password in the service provider web page.

5. A method in accordance with claim 3, said authenticating step comprising:
   determining a system time of the authentication system, a first time before the system time, and a second time after the system time;
   determining a difference between the first and second times;
   dividing the difference into time intervals; and
   generating a series of passwords that includes a password for each time interval, each password being generated using the modified shared secret and the beginning time of a respective time interval.

6. A method in accordance with claim 5, further comprising:
   comparing the one-time password against each password included in the series; and
   generating and transmitting a message to the service provider computer system when the one-time password matches a password included in the series.

7. A method in accordance with claim 6, said authenticating step comprising:
   generating a series of duress passwords when the one-time password does not match a password included in the series of passwords;
   comparing the one-time password against each duress password; and
   determining that the user is operating under duress when the one-time password matches a duress password.

8. A method in accordance with claim 7, further comprising determining an action to take in response to learning that the user is operating under duress.

9. A method in accordance with claim 1, said generating the modified shared secret step comprising combining the personal identification number, the hashed personal identification number, and the shared secret.

10. A method in accordance with claim 1, said generating the modified shared secret step comprising combining the shared secret with an error indicator number when the request time is before the previous request time.

11. A method in accordance with claim 10, further comprising:
   generating the one-time password with the modified shared secret and the request time;
   authenticating the one-time password; and prohibiting access to resources in a service provider system when said authenticating step is unsuccessful.

12. A system for authenticating users comprising:
an authentication system comprising an authentication database and being configured to store within said authentication database authentication data associated with authorized users, generate and store shared secrets, generate one-time passwords, and authenticate users; and
a communications device configured to obtain authentication data, store shared secrets, generate hashed personal identification numbers, and generate one-time passwords,
said communications device and said authentication system being configured to communicate over a network,
said authentication system being further configured to receive and store personal identification numbers transmitted from said communications device,
said communications device being further configured to
combine a hashed personal identification number with a new shared secret to generate a modified shared secret,
compare a time a one-time password is requested against a previous request time,
when the request time is after the previous request time, generate a one-time password with the modified shared secret and the request time, and
transmit the one-time password to said authentication system.

13. A system in accordance with claim 12, said authentication system being further configured to:
determine time intervals; and
generate a series of passwords, each password corresponding to a determined time interval and being generated with the modified shared secret and the beginning time of each corresponding time interval.

14. A system in accordance with claim 13, said authentication system being further configured to:
determine a system time of said authentication system, a first time before the system time, and a second time after the system time;
determine a difference between the first and second times; and
divide the difference into the time intervals.

15. A system in accordance with claim 13, said authentication system being further configured to:
compare the one-time password against each password included in the series; and
generate and transmit a message to a service provider system when the one-time password matches a password.

16. A system in accordance with claim 12, said authentication system being further configured to:
generate a series of duress passwords;
compare the one-time password against the duress passwords; and
determine that the user is operating under duress when the one-time password matches a duress password.

17. A system in accordance with claim 12, said communications device comprising:
a smart phone;
a tablet computer;
a laptop computer;
a desktop personal computer; or
a personal digital assistant.

18. A system in accordance with claim 12, said communications device being further configured to update the one-time password periodically and display the updated one-time password.

19. A computer program recorded on a non-transitory computer-readable recording medium included in a transaction management system, the computer program for enabling authentication of a user attempting to access resources stored in the transaction management system, the computer program for causing the transaction management system to execute at least the following:
retrieve a shared secret upon receiving a request for a one-time password;
compare a time the request was made against a previous request time;
when the request time is after the previous request time generate a hashed personal identification number from a personal identification number, otherwise initiate a shared secret replacement process;
combine the hashed personal identification number with the shared secret to generate a modified shared secret;
generate the one-time password with the modified shared secret and the request time;
determine time intervals;
generate a series of passwords that includes a password for each determined time interval, each password being generated using the modified shared secret and the beginning time of a respective time interval;
compare the one-time password against each password included in the series; and
permit the user to access the resources when the one-time password matches a password included in the series.

* * * * *